(12) United States Patent
Ben Hamozeg

(10) Patent No.: US 11,324,210 B2
(45) Date of Patent: May 10, 2022

(54) SYSTEM AND METHOD FOR DETECTING AGRICULTURAL PESTS

(71) Applicant: AGRINT SENSING SOLUTIONS LTD, Hod Hasharon (IL)

(72) Inventor: Yehonatan Ben Hamozeg, Rosh Haayin (IL)

(73) Assignee: AGRINT SENSING SOLUTIONS LTD, Hod Hasharon (IL)

( * ) Notice: Subject to any disclaimer, the term of this patent is extended or adjusted under 35 U.S.C. 154(b) by 731 days.

(21) Appl. No.: 16/087,458

(22) PCT Filed: Mar. 26, 2017

(86) PCT No.: PCT/IL2017/050373
§ 371 (c)(1),
(2) Date: Sep. 21, 2018

(87) PCT Pub. No.: WO2017/168412
PCT Pub. Date: Oct. 5, 2017

(65) Prior Publication Data
US 2019/0104715 A1    Apr. 11, 2019

Related U.S. Application Data

(60) Provisional application No. 62/313,987, filed on Mar. 28, 2016.

(51) Int. Cl.
*G01N 29/14* (2006.01)
*G01N 29/44* (2006.01)
(Continued)

(52) U.S. Cl.
CPC ............. *A01M 1/026* (2013.01); *G01N 29/14* (2013.01); *G01N 29/4427* (2013.01); *G08C 17/02* (2013.01); *G01N 2291/02466* (2013.01)

(58) Field of Classification Search
CPC ... G08C 17/02; A01M 1/026; G01N 29/4427; G01N 29/14; G01N 2291/02466
(Continued)

(56) References Cited

U.S. PATENT DOCUMENTS 3,356,868 A * 12/1967 Cother ...................... H03F 3/70
310/319
4,991,439 A    2/1991 Betts
(Continued)

FOREIGN PATENT DOCUMENTS

| CN | 104852989 A | 8/2015 |
|---|---|---|
| GB | 1407357 A | 9/1975 |

OTHER PUBLICATIONS

Hughes, TL 2015, A technique to enable the tracking of people for domestic energy monitoring applications, PhD thesis, University of Salford. (Year: 2015).*
(Continued)

*Primary Examiner* — Jacques M Saint Surin
(74) *Attorney, Agent, or Firm* — Oliff PLC

(57) ABSTRACT

A system for monitoring for presence of insects in non-hollow trees, the system including a structural element configured to be driven into the tree's interior and bearing a vibration sensor; and a processor configured to receive data recorded by the sensor, to detect presence of insects in the tree's interior by analyzing said data, and to generate alerts accordingly.

22 Claims, 11 Drawing Sheets

(51) Int. Cl.
*G08C 17/02* (2006.01)
*A01M 1/02* (2006.01)

(58) Field of Classification Search
USPC .................................................. 340/773.2
See application file for complete search history.

(56) References Cited

U.S. PATENT DOCUMENTS

| | | | |
|---|---|---|---|
| 5,285,688 | A | 2/1994 | Robbins et al. |
| 5,473,942 | A * | 12/1995 | Vick ..................... A01M 1/026 367/136 |
| 6,883,375 | B2 | 4/2005 | Dunegan |
| 7,117,149 | B1 * | 10/2006 | Zakarauskas ........... G10L 17/26 704/233 |
| 7,271,706 | B2 | 9/2007 | Lee |
| 7,597,003 | B2 * | 10/2009 | Hawwa ................. G01M 7/027 73/571 |
| 9,267,862 | B1 * | 2/2016 | Kavars ................ G01M 5/0033 |
| 9,489,824 | B2 * | 11/2016 | Osseiran ............... G08B 25/08 |
| 2004/0069064 | A1 * | 4/2004 | Blodgett ................ G01N 29/42 73/579 |
| 2011/0293094 | A1 * | 12/2011 | Os ........................ H04L 9/0869 380/255 |

OTHER PUBLICATIONS

Potamitis et al., "Automatic bioacoustic detection of Rhynchophorus Ferrugineus," 16th European Signal Processing Conference (EUSIPCO 2008), Aug. 25-29, 2008.

Mankin et al., "Perspective and Promise: a Century of Insect Acoustic Detection and Monitoring," American Entomologist, 2011, vol. 57, No. 1, pp. 30-44.

Rach et al., "On the Design of a Bioacoustic Sensor for the Early Detection of the Red Palm Weevil," Sensors, 2013, vol. 13, No. 2, pp. 1706-1729.

Martin et al., "Wireless implementation of mems accelerometer to detect red palm weevil on palms," International Conference on Advanced Electronic Systems (ICAES), IEEE, 2013, pp. 248-252.

Divos et al., "New non-destructive wood testing method," Erdeszeti es Faipar Tudomanyos Kozlemenyek (Hungary), 1996, pp. 179-184.

American Physical Society, "Tree acoustics identify rot and decay" Apr. 2014, [physicsbuzz.physicscentral.com/2014/04/tree-acoustics-identify-rot-and-decay.html].

Knight, David, "The internet of trees: Almost everything is becoming sensor-laden and connected, even nature. How can your organization benefit?" Network World, Mar. 2016, [computerworld.com/article/3038682/internet-of-things/the-internet-of-trees.html].

Hansen et al., "Will the Internet of Trees Be the Next Game Changer?" Feb. 2016, [sloanreview.mit.edu/article/will-the-internet-of-trees-be-the-next-game-changer/].

"Acoustics of wood" Course in Non Destructive Testing of Wood, ETSI Montes, ETS Arquitectura—Universidad Politécnica de Madrid, 2005, [http://www.aq.upm.es/Departamentos/Estructuras/epa/ndt05/1Treeeval/02%20Acoustics.pdf].

Bilski et al., "Detection of Wood Boring Insects' Larvae Based on the Acoustic Signal Analysis and the Artificial Intelligence Algorithm," Archives of Acoustics, 2017 Archives of Acoustics, vol. 42, No. 1, pp. 61-70.

Mankin et al., Acoustic system for insect detection in plant stems: comparisons of Cephus cinctus in wheat and Metamasius callizona in bromeliads,: J. Agric. Urban Entomol, 2004, vol. 21, No. 4, pp. 239-248.

Gutiérrez et al., "Development of a bioacoustic sensor for the early detection of Red Palm Weevil (*Rhynchophorus ferrugineus* Olivier)," Crop Protection, 2010, vol. 29, No. 7, pp. 671-676.

Martin, Betty, "A relative analysis on sound of Red Palm Weevil based on field and lab recordings," International Journal of Applied Engineering Research, 2015, vol. 10, No. 6, pp. 5261-5268.

Martin et al., "Fabrication of a Model to Identify RPW Existence Using Voice Board and MEMS Accelerometer," Research Journal of Pharmaceutical, Biological and Chemical Sciences, 2015, vol. 6, No. 5, pp. 863-868.

* cited by examiner

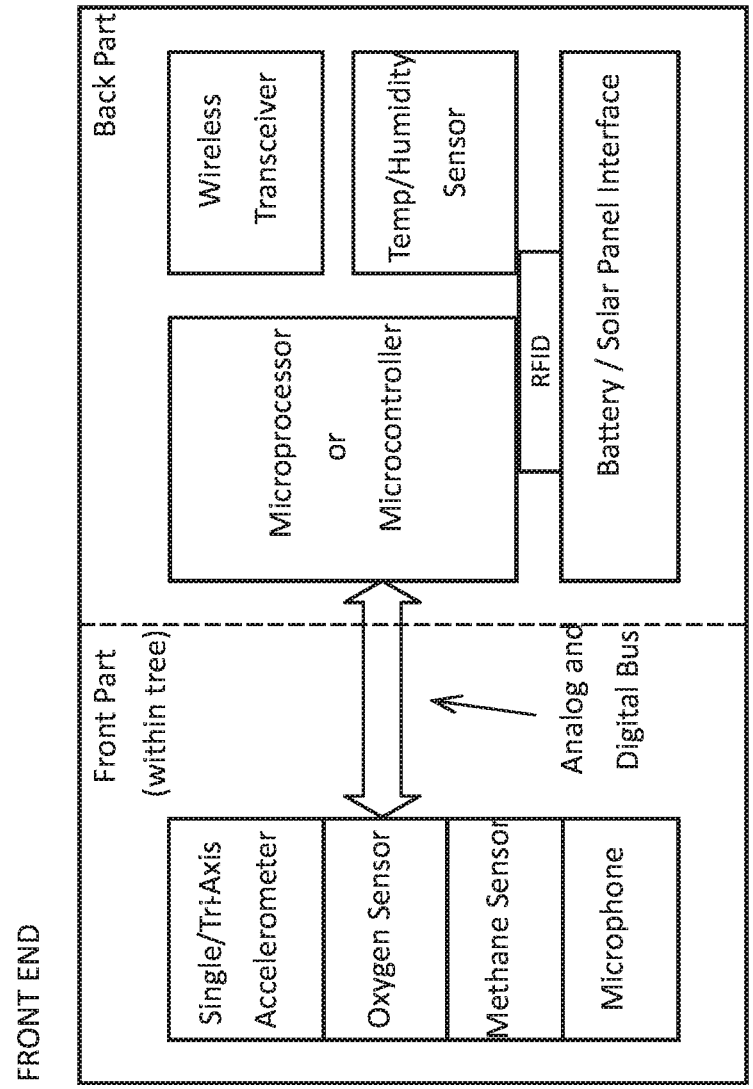

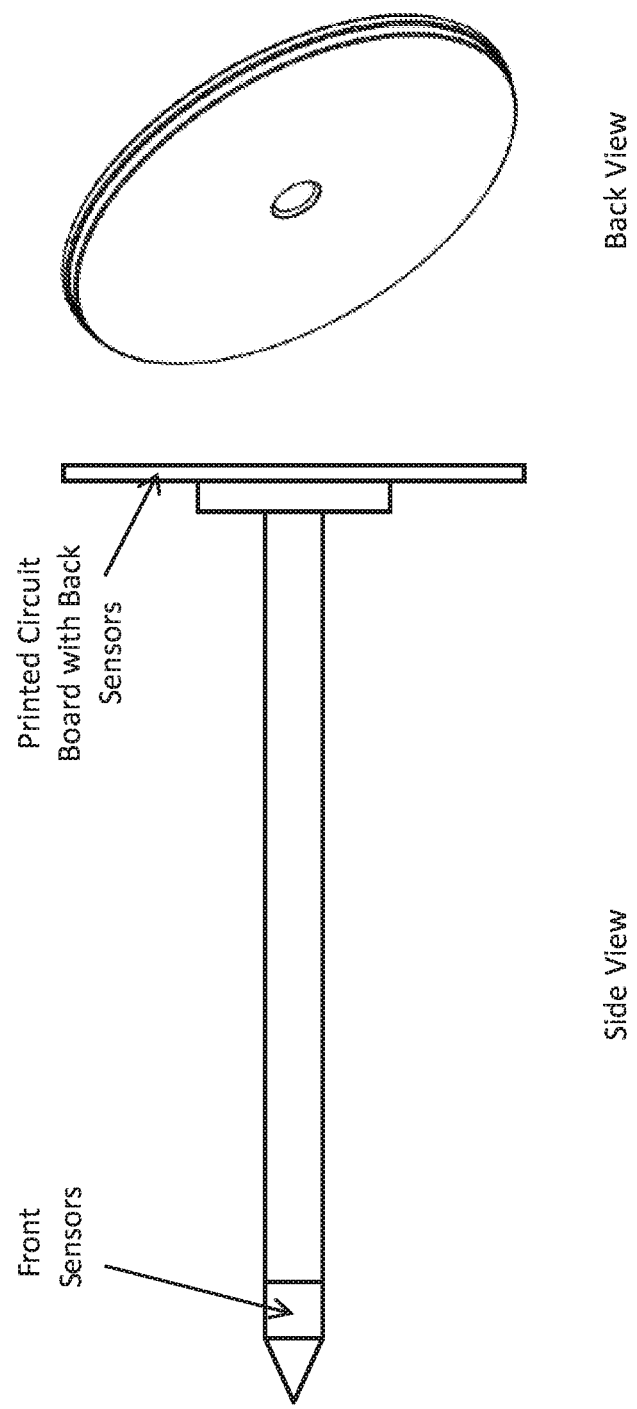

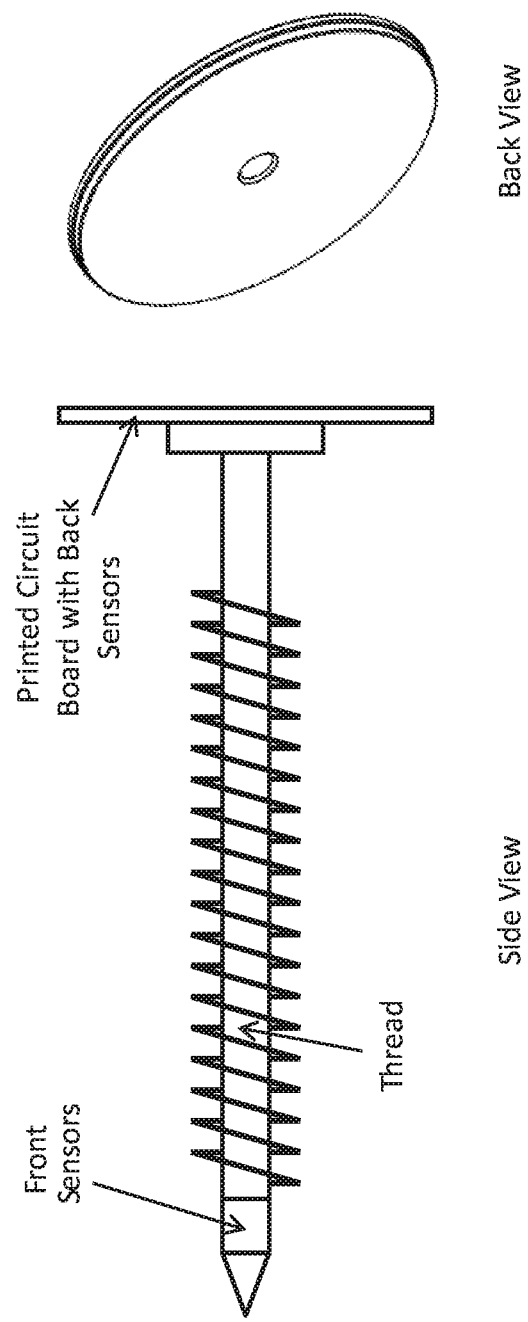

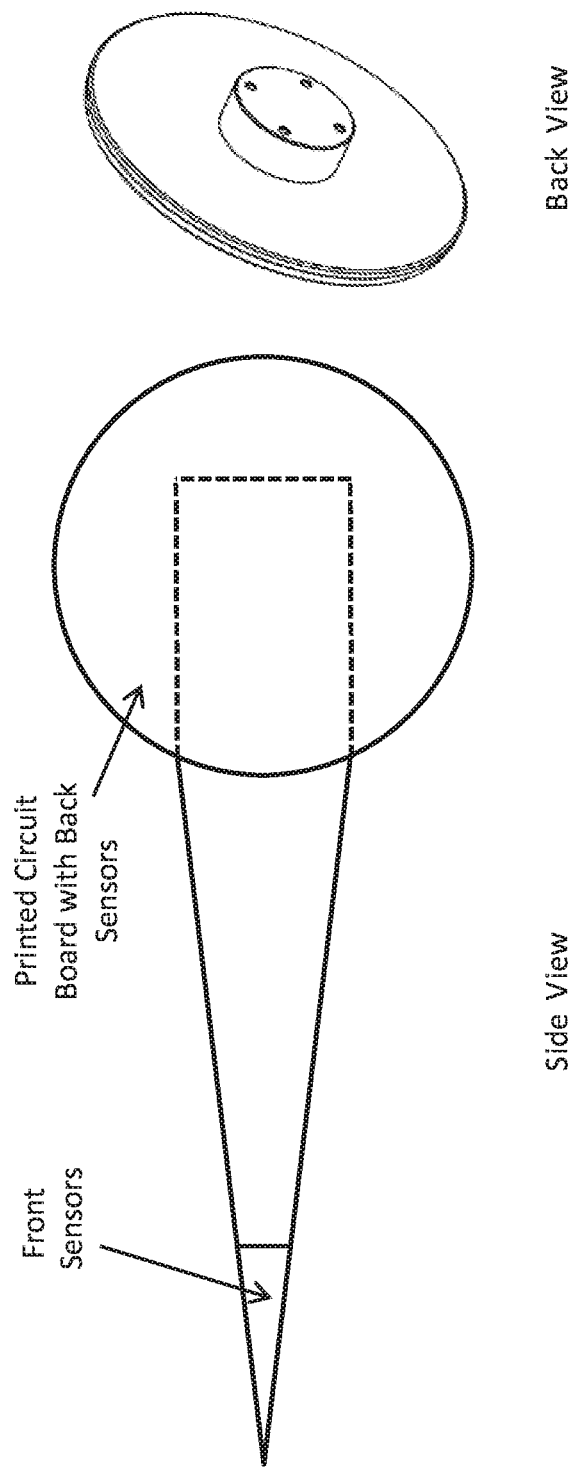

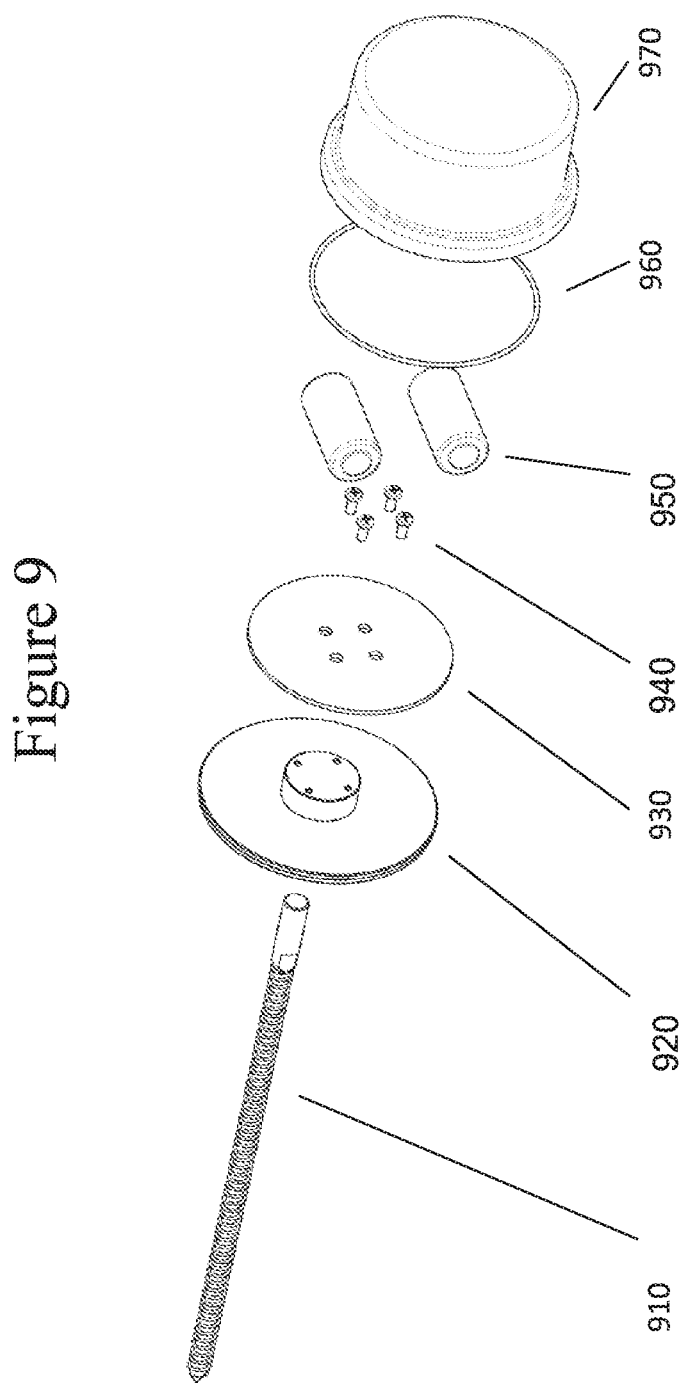

SYSTEM AND METHOD FOR DETECTING AGRICULTURAL PESTS

REFERENCE TO CO-PENDING APPLICATIONS

Priority is claimed from U.S. Provisional Patent Application No. 62/313,987 entitled "A System And Method For Detecting The Existence And Activity Of Vermin And Larvae In Trees And Plants" and filed Mar. 28, 2016 the disclosure of which application/s is hereby incorporated by reference.

FIELD OF THIS DISCLOSURE

The present invention relates generally to monitoring agricultural sites and more particularly to pest detection.

BACKGROUND FOR THIS DISCLOSURE

Detection of decayed wood based on an assumption that sound propagates faster in intact than in decayed wood, is known. For example, the following http link http://agris-.fao.org/agris-search/search.do?recordID=HU9700323 ("New non-destructive wood testing method", 1996, *Divos, F. Meszaros, K. (Erdeszeti es Faipari Egyetem, Sopron)* describes that while people want to keep old and large trees as long as possible, large trees are potential sources of danger since storms can fell damaged trees. Therefore, a test method for internal tree defect e.g. root decay is provided which relies on an assumption that sound propagates faster in intact than in decayed wood, whereas decayed wood is a good sound absorber. So, by knocking on the wood, a velocity difference may be found e.g. between an intact and a decayed tree. Needles with accelerometer detectors are used as mediators to reach through the bark to the wood. The needles do not seriously injure the tree for they are inserted just deep enough to bridge obstructive bark. In this product and similar products by fakopp.com, a signal may be generated by hitting a needle with a hammer, or by using a piezoelectric material in the sensor, and generating vibration in the tree using an electric current. Once this signal has been created by the testing process, the time delay is measured using a sensor placed elsewhere in the tree so as to yield the direct distance between two points or to indicate that the tree is hollow (in which case the vibration must travel a distance greater than the straight path).

Regarding the issue of internal vs. external sensing, experts have advised that "Looking inside the tree would involve invasive methods, like drilling and coring, which might harm or destroy the plant" as indicated in the following http link: physicsbuzz.physicscentral.com/2014/04/tree-acoustics-identify-rot-and-decay.html Detection of movement of termites in wood by acoustic emission techniques is described in published patent application U.S. Pat. No. 6,883,375.

A system for detecting wood-destroying insect infestations in wood is described in published patent application U.S. Pat. No. 5,285,688.

An apparatus for detecting insect-induced vibrations in particulate matter is described in patent U.S. Pat. No. 4,991,439.

Termite acoustic detection is described in published patent application U.S. Pat. No. 7,271,706.

A system for detecting presence of insects in a material under test is described in published patent application GB1407357.

Internet of things, where the things are trees, is known ("Internet of trees") e.g. in the following http links:
computerworld.com/article/3038682/internet-of-things/the-internet-of-trees.html
sloanreview.mit.edu/article/will-the-internet-of-trees-be-the-next-game-changer/

Use of a MEMS accelerometer to detect red palm weevils in trees, is described in Betty Martin et al, "Fabrication of a Model to Identify RPW Existence Using Voice Board and MEMS Accelerometer", ISSN: 0975-8585, RJPBCS 6(5) Page No. 863, Research Journal of Pharmaceutical, Biological and Chemical Sciences, September-October 2015.

Transverse waves, in a medium in with moving particles such as a tree interior being gnawed by insects e.g. larvae, are waves which move perpendicular to the direction of motion of the particles of medium m, as opposed to longitudinal waves which move parallel to the direction of motion of the particles of medium m.

Acoustics of wood are described in the following http link: F. C. Beall, aq.upm.es/Departamentos/Estructuras/epa/ndt05/1Treeeval/02%20Acoustics.pdf.

Vibration is commonly measured using a ceramic piezoelectric sensor or accelerometer or proximity probe i.e. non-contacting transducer that measures distance to a target e.g. in rotating machinery to measure vibration of a shaft.

Contact accelerometers may rely on the piezoelectric effect.

The disclosures of all publications and patent documents mentioned in the specification, and of the publications and patent documents cited therein directly or indirectly, are hereby incorporated by reference. Materiality of such publications and patent documents to patentability is not conceded.

SUMMARY OF CERTAIN EMBODIMENTS

Late detection of the presence of larvae or insects in trees constitutes a serious problem in the fight against the pest and in any attempt to guarantee pest-free status in adult trees. Undetected larvae can be transported within and between different agricultural regions inadvertently; consequently, improved methods of early detection would be greatly beneficial for control and reduction of the spread of these pests, as well as significantly reducing the use of chemicals currently used as preventive measures.

Larvae produce sounds and vibration as they move and feed within the tree trunk.

Certain embodiments seek to provide a system and method for detecting and protecting trees against pests including but not limited to parasites, beetles, etc. e.g. by installing an electronic device/s e.g. microphones and other sensors, inside or adjacent or on the tree that detects these creatures e.g. by listening for vibrations. A wide Cloud/Big Data service may be provided that gathers data from the tree devices and uses analytics software to map, alert, and generate reports based on readings collected by the devices.

Certain embodiments seek to provide a system and method for detecting activity of vermin and larvae in trees and plants.

Certain embodiments seek to detect insects including larvae in a tree interior by processing longitudinal and transverse waves using a tri- or dual-axis accelerometer connected to a structural element inserted into the tree.

Certain embodiments seek to provide a vibration sensor aboard or inside or otherwise fixed to a rigid structural element driven/forced into a vibrating; substrate e.g. tree-trunk, whose acceleration is to be measured.

Certain embodiments seek to detect insects using an internet-of-trees setup in which tree-embedded sensors are linked via typically wireless networks to a central server.

Embodiments may include:

Embodiment 1. A system and method for sensing sound and/or vibration-producing activity, hence detecting existence of, pests in plants e.g. trees.

Embodiment 2. A system and method according to embodiment 1 wherein the pests include vermin and larvae.

Embodiment 3. A system and method according to any of the preceding embodiments wherein the activity includes at least one of feeding, moving and tunneling.

Embodiment 4. A system and method according to any of the preceding embodiments and also including installing sensors sensing sound and/or vibration in operative association with at least a portion of the plant e.g. trunk, stein where sound and/or vibration-producing activity is expected.

Embodiment 5. A system and method according to any of the preceding embodiments wherein the sensors include electronic device/s e.g. microphone/s, accelerometer/s.

Embodiment 6. A system and method according to any of the preceding embodiments and also including a cloud service that gathers data from the devices and uses big data analytics to analyze readings collected by the devices.

Embodiment 7. A system and method according to any of the preceding embodiments and also comprising at least one coupling element typically operative for coupling activity to sensors located at a distance from the activity being sensed, e.g. sensors outside a core sensing activity in a core.

Embodiment 8. A system and method according to any of the preceding embodiments wherein the coupling element has a pin structure.

Embodiment 9. A system and method according to any of the preceding embodiments wherein the pin is threaded.

Embodiment 10. A system and method according to any of the preceding embodiments wherein the coupling element has a flat structure.

Embodiment 11. A system and method according to any of the preceding embodiments wherein to save energy and reduce need to change battery, the system's front end is sometimes in deep sleep mode.

Embodiment 12. A system and method according to any of the preceding embodiments wherein the front end wakes up from deep sleep mode if at least one of:

I. Energy above a certain configurable threshold is detected e.g. via accelerometer; II. Energy above a certain configurable threshold is detected e.g. via internal microphone; and III. Pre calculated required wake up time occurs.

Embodiment 13. A system and method according to any of the preceding embodiments wherein the front end is configured to wake more frequently when optimal environmental condition for analysis exists and less frequently otherwise; for example, according to certain embodiments, more frequently when the ambient temperature is warm, and less frequently when the ambient temperature is cold.

Embodiment 14. A system and method according to any of the preceding embodiments wherein the system includes a communication agent which may bundle together plural front end information packages and transmit them together to the server at a later time, rather than one at a time, given certain logical conditions defining urgency of the information packages and/or specific client preferences.

Embodiment 15. A system and method according to any of the preceding embodiments wherein at least one algorithm implemented within the communication agent takes into consideration conditions affecting plural trees which might potentially cause false alarms.

Embodiment 16. A system and method according to any of the preceding embodiments wherein the conditions include at least one of weather effects, noise or vibration that are a result of an external event e.g., airplane or a truck.

Embodiment 17. A system and method according to any of the preceding embodiments which is operative to classify the exact pest species based on pre-stored "fingerprints" unique to a vermin species and detectable by available sensor types.

Embodiment 18. A system and method according to any of the preceding embodiments wherein system users receive alerts using an end user device such as a mobile phone or tablet, email message/report.

Embodiment 19. A system and method according to any of the preceding; embodiments wherein a dedicated application may be used by system users to monitor plants e.g. trees they own.

Embodiment 20. A system and method according to any of the preceding embodiments wherein the app is operative for monitoring at least one of: vermin detection and classification history, temperature information, watering and fertilizer information.

Embodiment 21. A system and method according to any of the preceding embodiments wherein plant-dependent frequency response is adapted during setup by touching the tree multiple times and measuring the resonating frequency used to define the frequency range measured for that tree.

Embodiment 22. A system and method according to any of the preceding embodiments wherein for pests not active continuously, windows of operation are chosen for the sensor to reduce energy usage, based on pre-known patterns of pest activity for at least one given species.

Embodiment 23. A system and method according to any of the preceding embodiments wherein a main processor continually receives data from plural trees enabling an online learning algorithm to command certain systems deployed in certain trees to modify the duty cycle of their sampling windows and/or modify thresholds.

Embodiment 24. A system and method according to any of the preceding embodiments wherein modes of operation which burden system energy requirements are used only on occasion e.g. at times of higher local alert, and not constantly.

Embodiment 25. At least one processor configured to perform at least one of or any combination of the described operations or to execute any combination of the described modules.

Embodiment 26. A system and method according to any of the preceding embodiments wherein the sensor implemented algorithm analyze reading collected by device.

Certain embodiments of the present invention seek to provide processing; circuitry comprising at least one processor in communication with at least one memory, with instructions stored in such memory executed by the processor to provide functionalities which are described herein in detail.

The following embodiments may also be provided:

Embodiment a1. A system for monitoring for presence of insects in non-hollow trees, the system including:

a structural element configured to be driven into the tree's interior and hearing a vibration sensor; and a processor configured to receive data recorded by the sensor, to detect presence of insects in the tree's interior by analyzing the data, and to generate alerts accordingly.

Embodiment a2. A method for monitoring for presence of insects in non-hollow trees, the method including:

providing a structural element configured to be driven into the tree's interior and bearing a vibration sensor; and providing a processor configured to receive data recorded by the sensor, to detect presence of insects in the tree's interior by analyzing the data and to generate alerts accordingly.

Embodiment a3. A system according to any of the preceding embodiments wherein the processor is remote from the tree and obtains the data via a wireless data connection with the sensor.

Embodiment a4. A method according to any of the preceding embodiments wherein the data received by the processor comprises acceleration values along three axes.

Embodiment a5. A method according to any of the preceding embodiments wherein the sensor is mounted on a pin configured to be driven into the tree, thereby to enhance signal transmission from tree interior to sensor.

Embodiment a6. A system according to any of the preceding embodiments wherein the insect comprises a larva.

Embodiment a7. A method according to any of the preceding embodiments and also comprising applying (e.g. spraying or injecting) pesticides to trees according to the alerts.

Embodiment a8. A method according to any of the preceding embodiments wherein the sensor is embedded in the tree's trunk.

Embodiment a9. A system according to any of the preceding embodiments and also comprising an Internet of Things subsystem operative to collect the alerts.

The tree-cloud communication may be bi-directional, e.g. various coefficients and thresholds may be changed by Cloud commands. Each local sensor as at least a DSP capable processor, voltage measurement, real time clock, accelerometer and basic limited storage capabilities.

Embodiment a.10. A system according to any of the preceding embodiments wherein the trees comprise palm trees and the insects comprise red palm weevils.

Embodiment a11. A system according to any of the preceding embodiments and wherein a wireless network protocol configured to send packets of data at regular intervals over a wireless network, is employed by the subsystem to collect the alerts.

The communication usage duty cycle may be selected to conserve power, thereby to reduce the system's energy budget.

Embodiment a12. A system according to any of the preceding embodiments wherein the accelerometer is also configured to detect that the tree is being treated by a worker and wherein the Internet of Things subsystem is used to collect time-stamped outputs identifying durations of time in which a worker treated each tree.

Each individual worker may be identified (differentiated from other workers) using any suitable technology, such as but not limited to an RFID tag-reader arrangement, where the tree bears an RFID tag, and the worker an RFID reader, or vice versa, e.g. as shown in FIGS. 2b, 2c.

Typically, acceleration signals due to the tree being treated by a worker differ from the signals generated by insects/larvae gnawing; the signal played through the worker's mobile device may for example have accelerations at least an order of magnitude higher than the signals generated by insects/larvae gnawing. Alternatively or in addition, the pattern of the signal played through the worker's mobile device may differ from the signals generated by insects/larvae gnawing. For example, if the larva generate short duration "shock waves" or "clipping", the human activity marking signal may be of longer duration.

The tree's controller (which may reside on the same printed circuit board as the accelerator) is typically operative to measure the activity duration and to use the communication infrastructure to transmit the worker detection data to the central server e.g. cloud, associated with an identification of the tree tended, whose location is known to the central server. The controller may include one or more hardware devices e.g. chips, which may be co-located or remote from one another.

Embodiment a13. A method according to any of the preceding embodiments and wherein an RFID reader is mounted on the pin and is operative to generate time-stamped indications of workers with wearable RFID tags who are tending each individual tree.

One possible alternative technology for identifying the worker without use of an RFID tag/reader is to assign a unique vibration sequence to each worker. Then, when a worker approaches a tree, s/he sends the tree's sensor her or his unique vibration sequence e.g. using the worker's smartphone's vibration capabilities. For example, 64 unique vibration sequences can be generated using a sequence of 6 periods each consisting either of vibration or of stillness. So, for example, one worker might be associated with 3 periods of vibration and then 2 silent and then an additional vibration period, while another worker will generate a different sequence such as a still period followed by 5 periods of vibration. The tree's sensor picks up these vibrations and may send the control center aka central server aka cloud just a six bit code, from 1 to 64, representing a unique worker in a workforce of up to 64 workers. This method does not require the RFID to be operational.

Embodiment a14. A method according to any of the preceding embodiments and wherein an RFID tag is mounted on the pin and facilitates generation of time-stamped indications of tag-reader proximity, by RFID readers borne by workers who are tending each individual tree.

Embodiment a15. A system according to any of the preceding embodiments wherein the protocol comprises a LoRa protocol.

Other alternative long range wireless communication protocols might be used such as but not limited to SIGFOX, ZIGBEE, WIFI, BLE.

Embodiment a16. A system according to any of the preceding embodiments wherein the vibration sensor comprises an accelerometer.

Embodiment a17. A system according to any of the preceding embodiments wherein the vibration sensor comprises a Piezoelectric accelerometer.

Embodiment a18. A system according to any of the preceding embodiments and wherein the processor is configured for machine learning, including learning, based on a training set including:

samples of acceleration values along at least one axis from trees in which insects are present and samples of acceleration values along at least one axis from trees in which insects are absent, to differentiate acceleration values along at least one axis indicative of insect-generated body waves from acceleration values along at least one axis indicative of other noise.

Embodiment a19. A system according to any of the preceding embodiments wherein the accelerometer is tri-axial.

Embodiment a20. A system according to any of the preceding embodiments wherein the processor is configured to receive data representing transverse body waves recorded by the sensor, and wherein machine learning including using a training set including samples from trees in which insects are present and samples from trees in which insects are absent, is used to learn to differentiate sensor outputs indicative of insect-generated body waves from sensor outputs indicative of other noise.

Embodiment a21. A computer program product, comprising a non-transitory tangible computer readable medium having computer readable program code embodied therein, the computer readable program code adapted to be executed to implement a method for monitoring for presence of insects in non-hollow trees wherein a structural element bearing a vibration sensor has been driven into the tree's interior, the method including:

providing a processor configured to receive data recorded by the sensor, to detect presence of insects in the tree's interior by analyzing the data and to generate alerts accordingly.

Also provided, excluding signals, is a computer program comprising computer program code means for performing any of the methods shown and described herein when the program is run on at least one computer; and a computer program product, comprising a typically non-transitory computer-usable or -readable medium e.g. non-transitory computer-usable or -readable storage medium, typically tangible, having a computer readable program code embodied therein, the computer readable program code adapted to be executed to implement any or all of the methods shown and described herein. The operations in accordance with the teachings herein may be performed by at least one computer specially constructed for the desired purposes or general purpose computer specially configured for the desired purpose by at least one computer program stored in a typically non-transitory computer readable storage medium. The term "non-transitory" is used herein to exclude transitory, propagating signals or waves, but to otherwise include any volatile or non-volatile computer memory technology suitable to the application.

Any suitable processor's, display and input means may be used to process, display e.g. on a computer screen or other computer output device, store, and accept information such as information used by or generated by any of the methods and apparatus shown and described herein; the above processor/s, display and input means including computer programs, in accordance with some or all of the embodiments of the present invention. Any or all functionalities of the invention shown and described herein, such as but not limited to operations within flowcharts, may be performed by any one or more of: at least one conventional personal computer processor, workstation or other programmable device or computer or electronic computing device or processor, either general-purpose or specifically constructed, used for processing; a computer display screen and/or printer and/or speaker for displaying; machine-readable memory such as optical disks, CDROMs, DVDs, BluRays, magnetic-optical discs or other discs; RAMS, ROMs, EPROMs, EEPROMs, magnetic or optical or other cards, for storing, and keyboard or mouse for accepting. Modules shown and described herein may include any one or combination or plurality of: a server, a data processor, a memory/computer storage, a communication interface, a computer program stored in memory/computer storage.

The term "process" as used above is intended to include any type of computation or manipulation or transformation of data represented as physical, e.g. electronic, phenomena which may occur or reside e.g. within registers and /or memories of at least one computer or processor. The term processor includes a single processing unit or a plurality of distributed or remote such units.

The above devices may communicate via any conventional wired or wireless digital communication means, e.g. via a wired or cellular telephone network or a computer network such as the Internet.

The apparatus of the present invention may include, according to certain embodiments of the invention, machine readable memory containing or otherwise storing a program of instructions which, when executed by the machine, implements some or all of the apparatus, methods, features and functionalities of the invention shown and described herein. Alternatively or in addition, the apparatus of the present invention may include, according to certain embodiments of the invention, a program as above which may be written in any conventional programming language, and optionally a machine for executing the program such as but not limited to a general purpose computer which may optionally be configured or activated in accordance with the teachings of the present invention. Any of the teachings incorporated herein may, wherever suitable, operate on signals representative of physical objects or substances.

The embodiments referred to above, and other embodiments, are described in detail in the next section.

Any trademark occurring in the text or drawings is the property of its owner and occurs herein merely to explain or illustrate one example of how an embodiment of the invention may be implemented.

Unless specifically stated otherwise, as apparent from the following discussions, it is appreciated that throughout the specification discussions, utilizing terms such as, "processing", "computing", "estimating", "selecting", "ranking", "grading", "calculating", "determining", "generating", "reassessing", "classifying", "generating", "producing", "stereo-matching", "registering", "detecting", "associating", "superimposing", "obtaining" or the like, refer to the action and/or processes of at least one computer/s or computing system/s, or processor/s or similar electronic computing device/s, that manipulate and/or transform data represented as physical, such as electronic, quantities within the computing system's registers and/or memories, into other data similarly represented as physical quantities within the computing system's memories, registers or other such information storage, transmission or display devices.

The term "computer" should be broadly construed to cover any kind of electronic device with data processing capabilities, including, by way of non-limiting example, personal computers, servers, embedded cores, computing system, communication devices, processors (e.g. digital signal processor (DSP), microcontrollers, field programmable gate array (FPGA), application specific integrated circuit (ASIC), etc.) and other electronic computing devices.

The present invention may be described, merely for clarity, in terms of terminology specific to, or references to, particular programming languages, operating systems, browsers, system versions, individual products, protocols and the like. It will be appreciated that this terminology or such reference/s is intended to convey general principles of operation clearly and briefly, by way of example, and is not intended to limit the scope of the invention solely to a particular programming language, operating system, browser, system version, or individual product or protocol. Nonetheless, the disclosure of the standard or other professional literature defining the programming language, operating system, browser, system version, or individual product or protocol in question, is incorporated by reference herein in its entirety.

Elements separately listed herein need not be distinct components and alternatively may be the same structure. A statement that an element or feature may exist is intended to include (a) embodiments in which the element or feature exists; (b) embodiments in which the element or feature does not exist; and (c) embodiments in which the element or feature exist selectably e.g. a user may configure or select whether the element or feature does or does not exist.

Any suitable input device, such as but not limited to a sensor, may be used to generate or otherwise provide information received by the apparatus and methods shown and described herein. Any suitable output device or display may be used to display or output information generated by the apparatus and methods shown and described herein. Any suitable processor/s may be employed to compute or generate information as described herein and/or to perform functionalities described herein and/or to implement any engine, interface or other system described herein. Any suitable computerized data storage e.g. computer memory may be used to store information received by or generated by the systems shown and described herein. Functionalities shown and described herein may be divided between a server computer and a plurality of client computers. These or any other computerized components shown and described herein may communicate between themselves via a suitable computer network.

BRIEF DESCRIPTION OF THE DRAWINGS

Certain embodiments of the present invention are illustrated in the following drawings:

FIG. 2c is a simplified block diagram illustration of an individual front end from among the plural front ends of FIG. 1, in accordance with a third embodiment.

FIG. 3 includes side and back views of a coupling element having front and back portions, providing a physical structure for bearing the functionalities of any of FIGS. 2a-2c, and configured to be inserted into a tree front portion first, according to a first embodiment.

FIG. 4 includes side and back views of a coupling element having front and back portions, providing a physical structure for bearing the functionalities of any of FIGS. 2a-2c, and configured to be inserted into a tree front portion first, according to a second embodiment.

FIG. 5 includes side and back views of a coupling element having front and back portions, providing a physical structure for bearing the functionalities of any of FIGS. 2a-2c, and configured to be inserted into a tree front portion first, according to a third embodiment.

FIG. 9 is a simplified exploded isometric drawing of a coupling element constructed and operative in accordance with certain embodiments. As shown, the coupling element may include some or all of: a peg, threaded or otherwise, 910 which is wedged or forced or inserted under pressure into the tree's trunk, a base 920 of a suitable structural material such as metal e.g. aluminum or plastic, a printed circuit board 930 bearing a processor/controller providing any or all of the local functionalities shown and described herein, and accelerometer, a power source 950 which may be disposable or rechargeable, an O-ring 960 and a cap 970.

Figure 1:
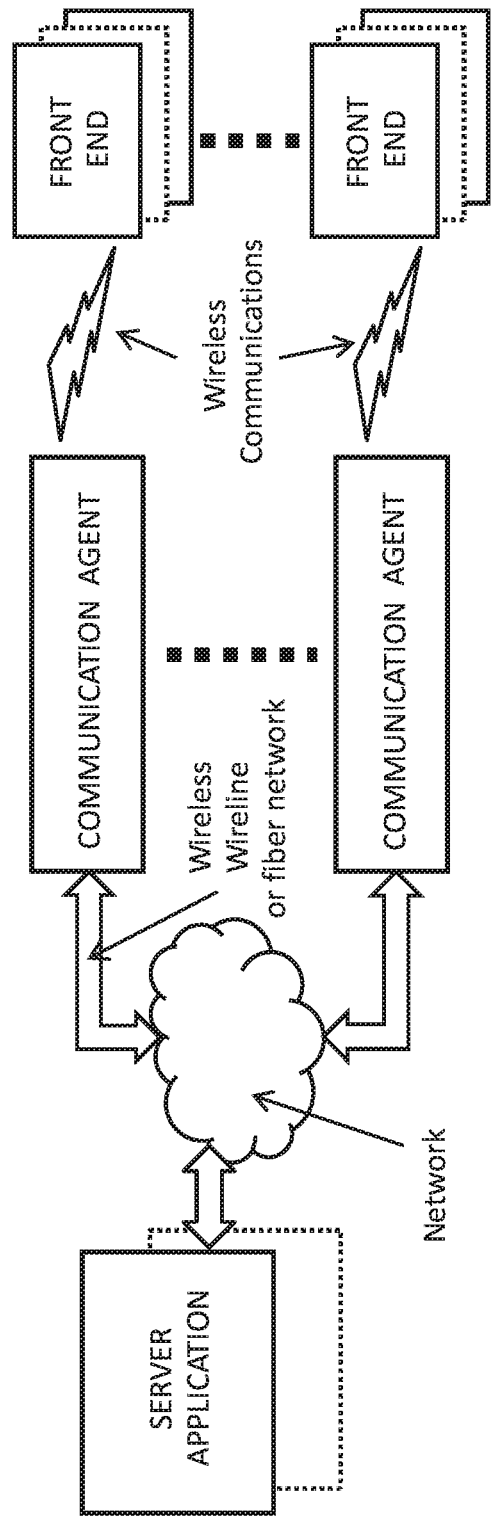
FIG. 1 is a simplified semi-pictorial semi-block diagram illustration of a system according to certain embodiments including a server end and plural front ends aka client ends aka tree subsystems.

Methods and systems included in the scope of the present invention may include some (e.g. any suitable subset) or all of the functional blocks shown in the specifically illustrated implementations by way of example, in any suitable order e.g. as shown.

Computational, functional or logical components described and illustrated herein can be implemented in various forms, for example, as hardware circuits such as but not limited to custom VLSI circuits or gate arrays or programmable hardware devices such as but not limited to FPGAs, or as software program code stored on at least one tangible or intangible computer readable medium and executable by at least one processor, or any suitable combination thereof. A specific functional component may be formed by one particular sequence of software code, or by a plurality of such, which collectively act or behave or act as described herein with reference to the functional component in question. For example, the component may be distributed over several code sequences such as but not limited to objects, procedures, functions, routines and programs and may originate from several computer files which typically operate synergistically.

Each functionality or method herein may be implemented in software, firmware, hardware or any combination thereof Functionality or operations stipulated as being software-implemented may alternatively be wholly or fully implemented by an equivalent hardware or firmware module and vice-versa. Firmware implementing functionality described herein, if provided, may be held in any suitable memory device and a suitable processing unit (aka processor) may be configured for executing firmware code. Alternatively, certain embodiments described herein may be implemented partly or exclusively in hardware in which case sonic or all of the variables, parameters, and computations described herein may be in hardware.

Any module or functionality described herein may comprise a suitably configured hardware component or circuitry. Alternatively or in addition, modules or functionality described herein may be performed by a general purpose computer or more generally by a suitable microprocessor, configured in accordance with methods shown and described herein, or any suitable subset, in any suitable order, of the operations included in such methods, or in accordance with methods known in the art.

Any logical functionality described herein may be implemented as a real time application if and as appropriate and which may employ any suitable architectural option such as but not limited to FPGA, ASIC or DSP or any suitable combination thereof.

Any hardware component mentioned herein may in fact include either one or more hardware devices e.g. chips, which may be co-located or remote from one another.

Any method described herein is intended to include within the scope of the embodiments of the present invention also any software or computer program performing some or all of the method's operations, including a mobile application, platform or operating system e.g. as stored in a medium, as well as combining the computer program with a hardware device to perform some or all of the operations of the method.

Data can be stored on one or more tangible or intangible computer readable media stored at one or more different locations, different network nodes or different storage devices at a single node or location.

It is appreciated that any computer data storage technology, including any type of storage or memory and any type of computer components and recording media that retain digital data used for computing for an interval of time, and any type of information retention technology, may be used to store the various data provided and employed herein. Suitable computer data storage or information retention apparatus may include apparatus which is primary, secondary, tertiary or off-line; which is of any type or level or amount or category of volatility, differentiation, mutability, accessibility, addressability, capacity, performance and energy use; and which is based on any suitable technologies such as semiconductor, magnetic, optical, paper and others.

DETAILED DESCRIPTION OF CERTAIN EMBODIMENTS

An embodiment of the invention includes a front end, Communication Agent, and Server e.g. as shown in FIG. 1. The front end typically uses dedicated coupling hardware, electronic circuits and sensors, and firmware in order to detect the presence of vermin inside or on the surface of the tree or plant. In order to provide an accurate detection but at the same time keep false alarms to a minimum, the coupling hardware, the electronic circuit, and the firmware may be configured positioned and operative to be able to pick up the specific signals that are generated by the vermin as it moves and eats into the tissue of the tree or plant.

A set of sensors e.g. some or all of those illustrated, that can measure different physical signals and phenomena, may be used in combination and their outputs are analyzed by software algorithms, e.g. some or all of the illustrated and/or described operations, suitably ordered e.g. as shown, to ensure that background signals and noises unrelated to the existence of the vermin do not affect the detection decision.

The front end is the system element that is installed in or on the tree or plant. It may include a metal coupling element, and a printed circuit board with the electronic circuits. The coupling element is operative for holding together the sensors and electronic circuit, and/or for coupling some of the physical effects (such as vibration) to sensor/s installed on the printed circuit board. Examples of coupling elements can be seen in FIGS. 3 to 5.

Figure 2A:
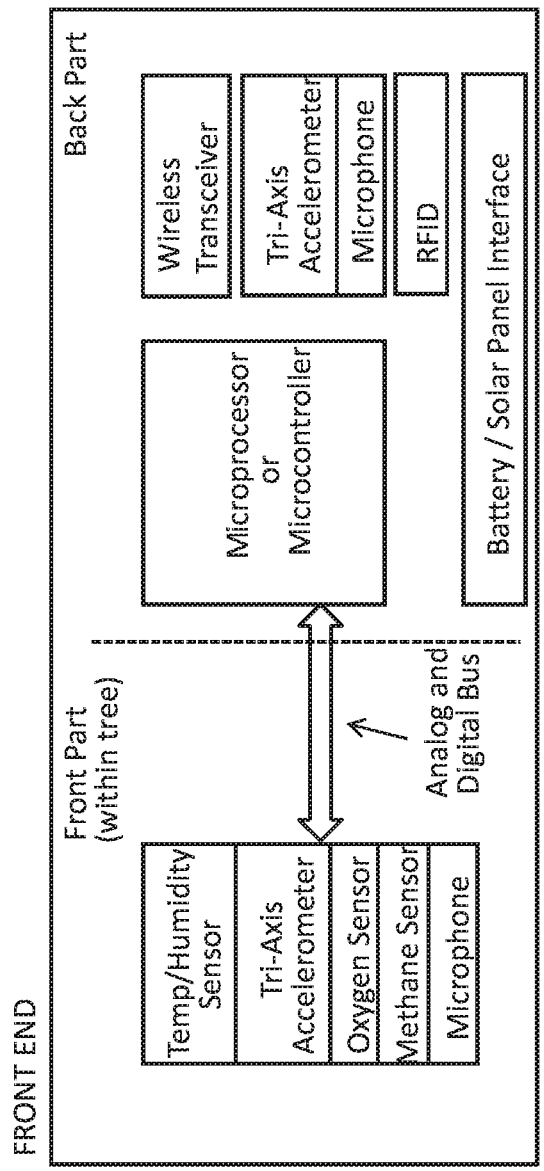
FIG. 2a is a simplified block diagram illustration of an individual front end from among the plural front ends of FIG. 1, in accordance with a first embodiment.
Figure 2B:
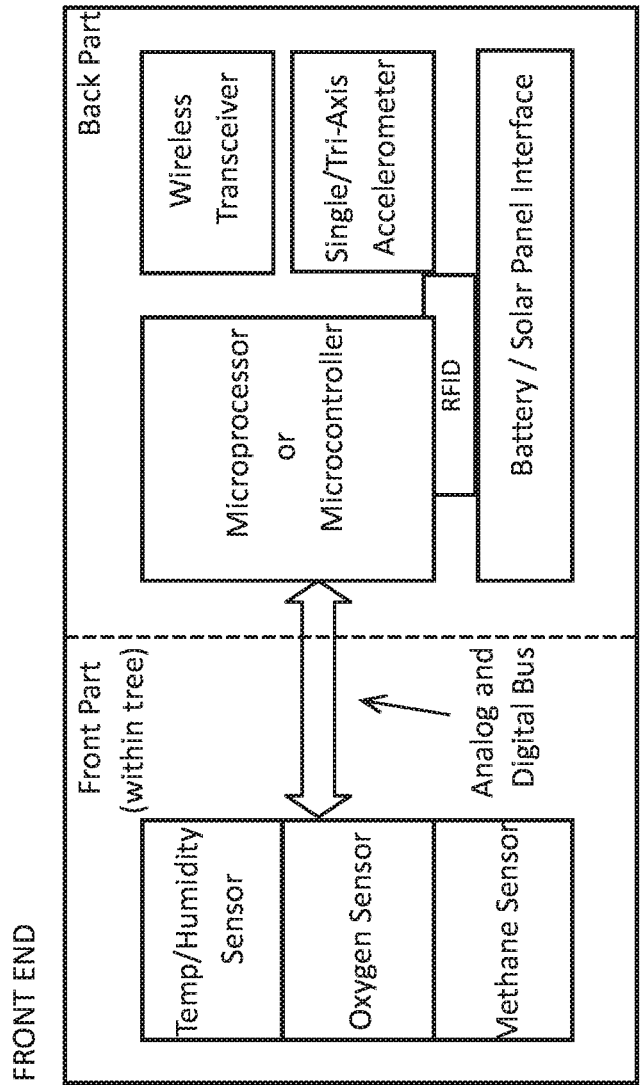
FIG. 2b is a simplified block diagram illustration of an individual front end from among the plural front ends of FIG. 1, in accordance with a second embodiment.

Some or all of the sensors may be mounted on the tip of the coupling element and are therefore installed as a "front portion" of the local or tree-installed apparatus, within the tree tissue (and is marked "Front Part" in FIGS. 2a-2c) and/or some or all sensors, termed "back portion", may be installed on the printed circuit board are marked "Back Part" in FIGS. 2a-2c) and are, according to certain embodiments, left outside the tree.

In FIGS. 3-5, the "front sensors" may for example include some or all of temperature/humidity/vibration e.g. acceleration/oxygen/methane sensors and/or a microphone, whereas the "back sensors" residing on the printed circuit board may for example include temperature/humidity/vibration e.g. acceleration sensors and/or microphone. Example sensors include the LM75 temperature sensor from NXP; INMP621ACEZ-R7 microphone from InvenSense.

For an accelerometer, LIS3DHTR, accelerometer from ST Microelectronics or KX122-1037 accelerometer from Kioni may for example be used. More generally, a low power complete 2 or 3 axis MEMS accelerometer with signal conditioned voltage outputs all on a single monolithic IC may be employed, or a (typically analog) accelerometer having only some of the above properties. Any suitable acceleration range may be employed such as, say, for detection of red palm weevils, ±2 g. Typically, the orientation of the transverse and longitudinal waves vis a vis the x, y and z accelerometer axes changes depending on the position of the sensor relative to the larvae. An advantage of using a tri-axial accelerometer is that transverse waves (say) generated by the insects have a dominant axis which depends on the location of the larvae in the tree relative to the position of the sensor.

Depending inter alia on the specific tree or plant species as well as its size, a different structure of coupling element may be used for conducting the signals to the sensors in the optimal way. Example structures of coupling elements can be seen in FIG. 3 (pin structure), FIG. 4 (threaded pin structure), and FIG. 5 (flat structure) which is a knife like piece of metal. Smaller trees may be better served by the flat structure coupling elements, while larger ones may be better served by the pin or threaded pin structure.

The threaded pin coupler may be inserted into the trunk of the tree or plant by applying pressure while rotating the pin. Advantages of the threaded pin structure coupler may include the bigger surface area that is in contact with the trunk and the ability to couple vibrations in all three axes more efficiently.

FIG. 9 is a simplified exploded isometric drawing of a coupling element constructed and operative in accordance with certain embodiments. Regarding the embodiments of FIGS. 3-5 and 9, as appropriate, it is appreciated that the pin's (aka coupling element or peg) material need not be electrically conductive, and is typically rigid enough to provide the structural element with enough stiffness/rigidity to be forced into the tree but not so rigid as to fail to conduct tree interior vibrations (transverse and/or longitudinal), to the accelerometer when the pin has been inserted into the tree. For example, a carbon steel pin of diameter 6-10 mm has been found suitable.

The pin may or may not comprise a screw, with any suitable type of threading. The pin may even be hollow. Typically, the pin is inserted under pressure rather than loosely, thereby to facilitate "signal transmission" from the tree to the sensor e.g. accelerometer on/in the pin. For example, the pin may be inserted at an "assembly location" disposed up to, say, 50 cm from the top of the tree's stem or trunk portion, or from the bottom thereof, typically although not necessarily on the southern side of the tree. The tree stem is cleared of branches at the assembly location. The pin is inserted into the stem e.g. by inserting the screw using a suitable drilling machine leaving part of the screw outside the tree (say, 3 cm of length) for sensor connection. Then the accelerometer is connected to the screw and tightened if, and as necessary, e.g. using a wrench.

According to certain embodiments, each worker is capable of demonstrating his presence at a tree by generating a characteristic vibration sequence. For example, the worker's smartphone may include an internal vibrator that can be played in a pre-specified sequence characteristic of that worker e.g. using On-off keying (OOK). Upon approaching the tree, the worker may then position his vibrator sequence generator e.g. phone adjacent to or in actual physical contact with the pin, if mounted low enough, or adjacent to or in actual physical contact with the tree (e.g. if the pin is mounted higher than the worker can reach), to facilitate direct contact between the phone and the pin-mounted sensor or at least the tree.

According to certain embodiments, the coupling element is typically operative for coupling the physical effects and phenomena that are present at the core of the tree or plant to the sensing elements located outside the core. As some of the physical effects measured are vibration and sound, the coupling element may be made of a solid material to effectively conduct the signal, for example metal.

According to certain embodiments, the pin may be formed of any suitable material e.g. metal/steel/iron and other cross sections, selected to be similar to the rigidity of carbon steel using a diameter of, say, 6-10 mm or pre-tested for suitability (e.g. rigid enough for the structural element to be forced into the tree but not so rigid as to fail to conduct insect/larva-generated tree interior vibrations) relative to the carbon steel diameters described herein and/or on trees known to be infested. Typically, a material suited for outdoor conditions is selected such as but not limited to carbon steel (say 12L14, C1008, C1022 steel materials or similar).

The pin is typically long enough (say 60-400 mm for palm trees) to enable the pin, when installed, to pass all the way through the peripheral portion of the tree trunk because the peripheral portion of the tree trunk does not vibrate, being relatively rigid and typically not chewed by larvae in contrast to the tree trunk's central portion, which is softer and gets chewed. Also, the peripheral of the tree trunk may include leftover leaves which are not an integral part of the tree trunk. According to certain embodiments, plural pin variants are used for different tree sizes e.g. 60 mm long pins for trees up to 200 mm in diameter, 110 mm long pins for medium trees up to 500 mm and 200 mm long pins for large trees which are typically up to 1 m in diameter.

The electronic components included in the front end may be assembled in any suitable matter e.g. as per the embodiments illustrated in in FIGS. 2a to 2c.

The front end typically includes an energy source that may be a battery and/or a solar panel, a processing unit, a typically wireless communications circuit, and may include all or any subset of the following sensors: multiple axis accelerometer, two microphones (one that is internal to the tree/plant, and one that is external, temperature and humidity sensor, oxygen sensor, and methane sensor.

The sensors are all connected to a microprocessor circuit (the above mentioned processing unit) that samples their output signals and activates the first part of the detection and classification algorithm.

On a typically configurable basis, the front end may wirelessly transmit both samples of the raw sensor data as well as processed meta-data (that is the result of the above first part (e.g. front end processing block) of the detection and classification algorithm (e.g. of FIG. 8) to the communication agent. Any suitable typically wireless communication equipment may be provided e.g. a BLE112 wireless transceiver from Bluegiga or any other suitable wireless communication subsystem e.g. via WiFi, Bluetooth or Zigbee.

When there is no specific sensitivity or no suspicion of the existence of parasites, the time basis may for example be every few hours or weeks e.g. every 6 hours, and the proportion of time in which the sensor is active may be greater in hours with better environmental conditions (e.g., warm temperature) and smaller in other hours (e.g., cold temperature).

According to certain embodiments, the front end occasionally e.g. once every few days, weeks or months (say 3-6 weeks) may wake up and may sample environmental conditions (e.g., temperature and humidity) once or more than once e.g. at intervals, say for example once every 0.5 or 1 or 2 or 3 or 4 hours and may, responsively, adjust its self-knowledge of optimal hours (e.g., warm and cold hours). The data thus aggregated may be used to perform statistical analytics of environmental conditions e.g. to compute average temperature, winds or ambient noise in the tree's vicinity, and accordingly, to calibrate one or more of the sensor's operational parameters.

Figure 6:
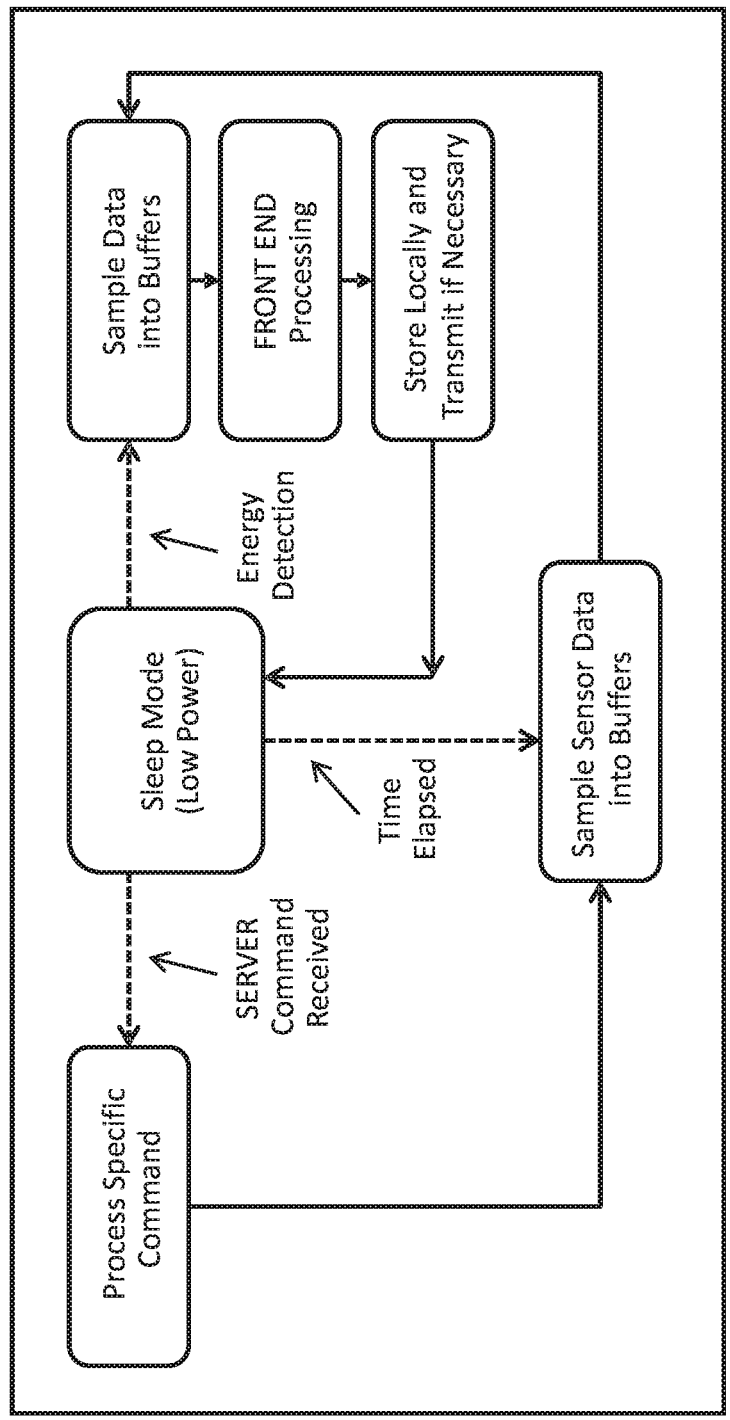
FIG. 6 illustrates a dual mode (sleeping, waking method of operation for the front end of any of FIGS. 2a-2c.

In order to save energy and prolong the product life time without the need to change battery, the front end may be in deep sleep mode some or most of the time. For example, the front end may wake up from deep sleep mode when (or only when) some, or all, of the following events occur: energy above a certain configurable threshold is detected via the accelerometer; energy above a certain configurable threshold is detected via the internal microphone; and/or the pre calculated required wake up time has come. Example deep sleep and wake up scenarios and conditions are shown in FIG. 6.

The front end typically deploys self-adapting behavior in order to prolong the product life time as long as possible. For example, the thresholds for waking up in conditions I and II above may change over time, based on the frequency of such past events, or an external command from the server. For example, it may be that the more wake up events occur during a specified time window, the higher the threshold may become, whereas when fewer wake up events occur, the lower the threshold may become. As most vermin are more active as the temperature rises, the front end periodically wakes up once every hour (as an example) and reads the ambient temperature. It is therefore able to detect the warm hours of the day. Optionally, after several days it is able to wake up more frequently during the warm hours and less frequently during the cold hours.

Figure 7:
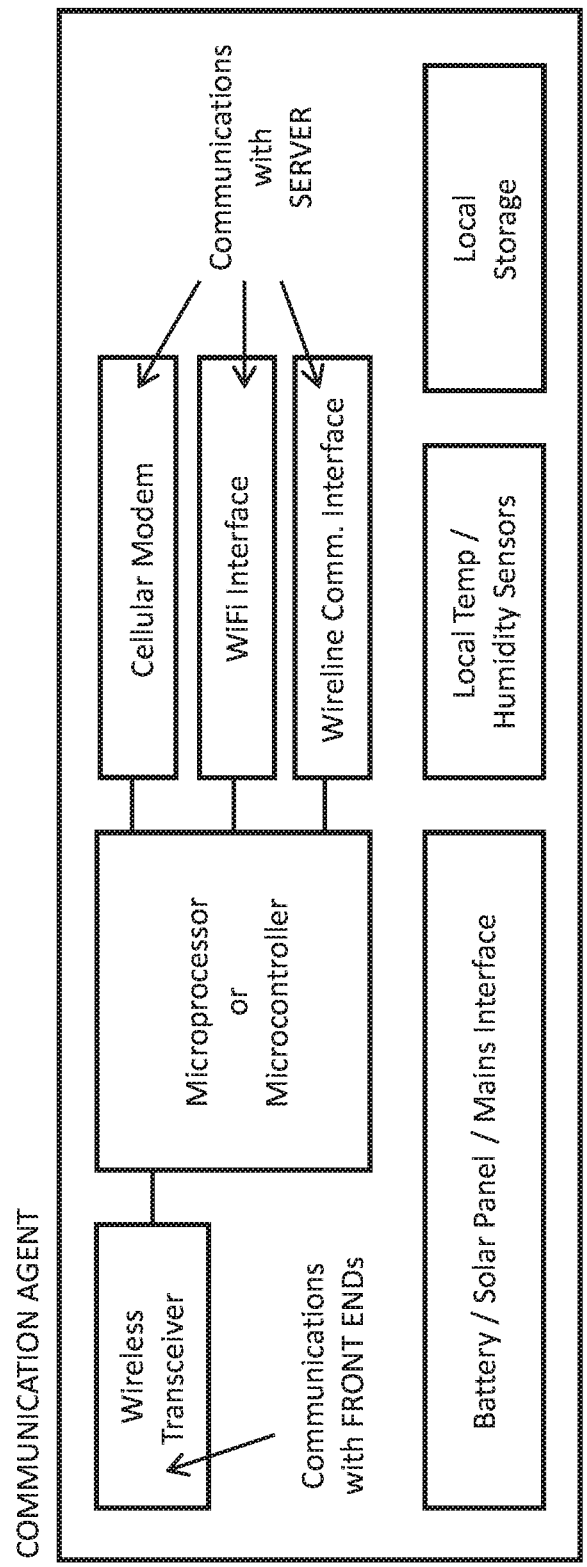
FIG. 7 is a simplified block diagram illustration of an individual communication agent from among the plurality of communication agents of FIG. 1, all in accordance with certain embodiments of the present invention.

The communication agent e.g. as shown in FIG. 7, may include a processing unit, wireless communication circuits that are used for interfacing with the front end elements, communication circuits (wireless and/or wired) for interfacing with the server, and an energy source that may, say, be either a chargeable battery, a solar panel, fixed power feed, or a combination of the above. The communication agent may serve between one front end to plural e.g. hundreds of front ends. When receiving the transmission from the front end, the communication agent verifies it can identify the front end, then locally stores the received information communication agent, runs two additional detection and classification algorithms—one on the raw data, and one on the (first) meta-data that has been processed earlier by the front end (e.g. by front-end processing block of FIG. 8). Then the communication agent transmits to the server an "information package" which may include some or all of: a complete set of raw data from the front end, first meta-data from the front end, and second meta-data that has been calculated within the communication agent firmware, for example correlation between detection and patterns among adjacent trees, environmental noise level etc.

Figure 8:
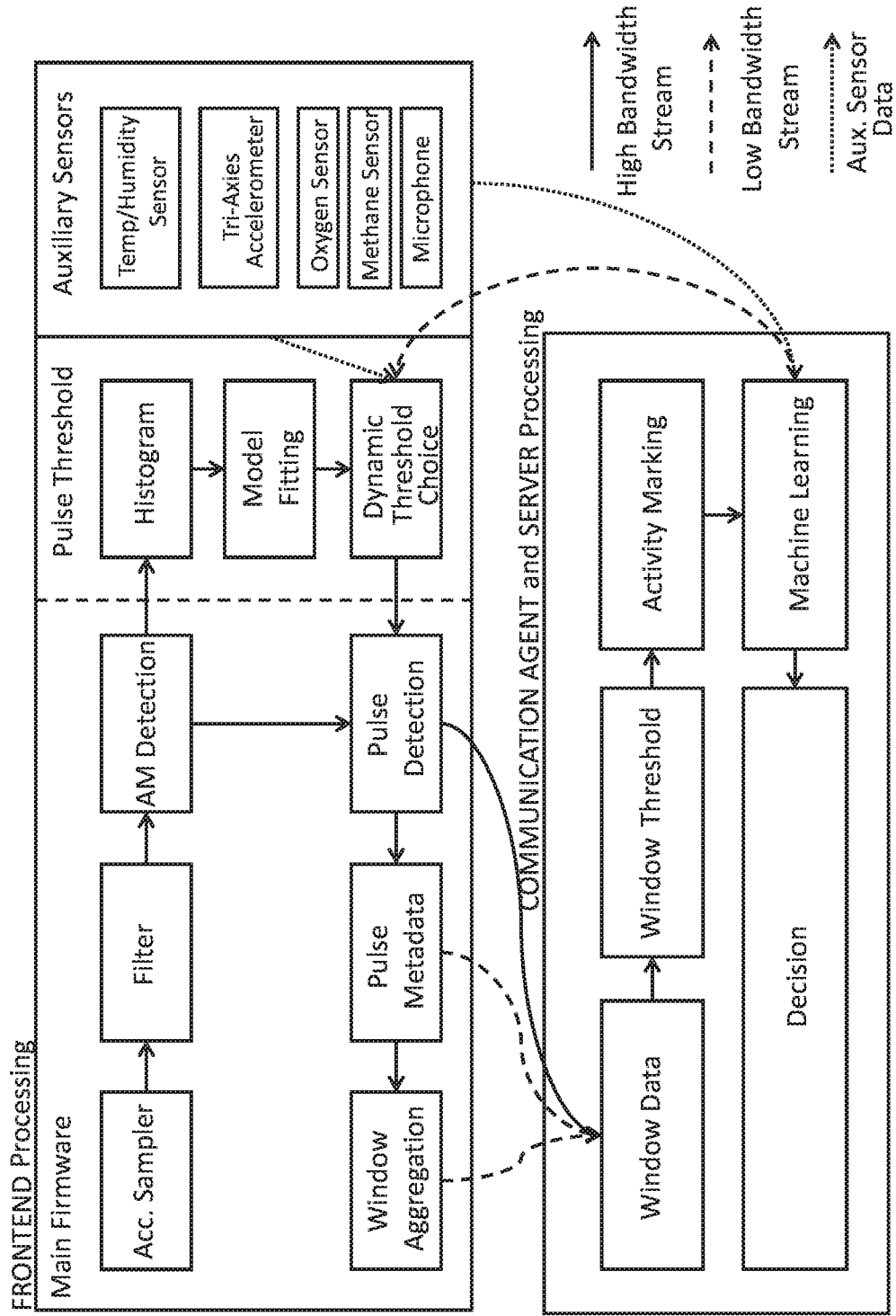
FIG. 8 is a simplified flow diagram of computational functionality some or all of which may be provided, whether firmware-implemented or processor-implemented, either locally (at the tree) or centrally e.g. at the server application of FIG. 1; the particular distribution of functionalities illustrated being merely by way of example.

In FIG. 8, typically frontend processing functionality is provided including some or all of the following:

Acceleration Sampler which may be operative for analog signal sampling from one or more sensor axes and conversion to digital signal. Digital signal may be divided into frames which may be spaced by a constant interval.

Filter—frame may be filtered for noise reduction and/or for sub-band level analysis.

AM detection—frame may be searched for suspicious pulses of insect.

Pulse threshold—suspicious pulses of insect may be filtered based on an adaptive threshold based on pulse characteristics, noise level, and auxiliary sensors data.

Pulse detection—high confidence pulses of insect may be detected by suitable analysis of suspicious pulses.

Pulse metadata—high confidence pulses features may be extracted.

Window aggregation—high confidence pulses parameters may be stored e.g. for a constant number of frames and may be transmitted to communication agent on occasion e.g. at constant intervals or when urgent data has accumulated.

Auxiliary sensors may include any suitable additional frontend sensors providing supplemental data for tree analysis.

Communication agent and server processing functionality may be provided, which may include some or all of the following:

Window data—characteristics of larva activity from each tree in the plantation may be collected and time may be synchronized for plantation level post-processing.

Window threshold—intended to include environmental noise detection.

Activity marking—intended to include filtering of noisy tree reports.

Machine learning—intended to include computation of each tree larva activity confidence which may be learned from filtered tree reports and/or past reports. Machine learning may for example be operative to use a classifier previously trained, on accelerometer outputs generated in infested trees and clean trees, to differentiate infested trees from clean ones. A Decision may be made to designate an individual tree's status as clean or infected.

In order to save on communication costs, and if communication with the server is limited in bandwidth or is not always be present, the communication agent may bundle together several front end information packages and transmit them together to the server at a later time.

Part of the algorithms implemented within the communication agent that cannot take place within a single front end take into consideration wider and environmental related conditions which might potentially cause false alarms such as weather effects, rain, noise, vibration effects that are a result of an airplane or a truck etc.

A suitable server application is provided e.g. on a cloud. When received by the server, the information packages are processed by the last parts of the detection and classification algorithms. The server typically is operative to analyze and process some or all of: raw data from the front end, first meta-data from the front end, and second meta-data from the communication agent. Based on the results, the server may then determine some or all of the probability for the presence and activity of a vermin and the probability of a false detection.

In some cases it is possible to classify the exact species based on certain "fingerprints" that are a result of unique effects of that vermin species on all the available sensor types. The system administrator may define, based on specific client preferences and the urgency related to the specific vermin or tree type, whether it should immediately report and warn the owner of the tree or plant, or wait until more readings and reports are received to improve the specificity, and only then issue the alert. If there is time available before the parasite can seriously damage the tree, the system typically waits for several detection event candidates within a time window before declaring an existence of a parasite and issuing an alert to the user, since it is highly unlikely that true existence of a parasite is detected only once within, say, a 6 or 12 hour time window. System users may receive alerts using any available media such as a mobile phone or tablet, an email message/report. A dedicated application may be used by the clients to monitor the status and behavior of the trees and plants they own, such as vermin detection and classification history, temperature information, watering and fertilizer information etc.

Any suitable detection and classification algorithms may be employed, for detecting the features of the vermin movement and bite effects while reducing the likelihood of false positives. Each species of vermin and as an example the red palm weevil (*Rhynchophorus ferruginous*) may have well differentiated movements that may be appropriately identified and captured by the signal processing stage. The specific frequency ranges of these signals may be identified, and may, e.g. for red palm weevils, include a lower frequency (hundreds of Hz) alongside a much higher frequency (several KHz) waves.

The information from each sensor (or even from each axis of an accelerometer) may be passed through a band pass filter with attributes chosen to best improve the original Signal to Noise Ratio (SNR). The sampling of the fastest changing signals is typically performed at sampling rates higher than 10K samples per second (KSPS) to prevent aliasing the signal.

When approaching a tree for the first time, and after installing the sensor in its intended or final location, a training phase is typically preformed. The frequencies of the lower range are affected by the attributes of the specific tree being measured. As such, this range is captured during the initial setup phase by gently touching the tree multiple times and measuring the resonating frequency, which is used to define the low frequency range measured for that tree. At this point, a 5-minute (say) sample of each axis may be performed.

Filtering the sample into the two ranges, the signal may then be passed through amplitude modulation detection and a histogram of that detection may be generated. This histogram may then be fitted to an approximated model that validates the highest amplitude likely to be seen from a sample consisting of pure noise. This threshold is specific to a given axis, so multiple thresholds may be used, e.g. one per axis. These thresholds may then be used for the ongoing testing phase, during which a signal is detected.

Threshold and noise levels may change as a function of temperature, connectivity to the tree and other factors, so this training setup is typically redone on occasion e.g. periodically to ensure that the thresholds remain optimal. The new threshold resulting from re-training may be signaled back to the main processing unit. Under certain conditions e.g. if a large variation between new and old thresholds is detected, a command for adjacent trees to recalibrate (re-train) may be given. The algorithm may also take additional data e.g. temperature, moisture and/or other environment measurements into consideration when deciding on the thresholds to be used. This additional data may be used for predicting the expected noise level and expected vermin activity.

During the testing stage, sensor axes may be filtered and passed through amplitude modulation. Each resulting stream may then be compared to the saved threshold for that axis.

Once the threshold is passed, a 50-150 ms (say) hold on time is generated to avoid one pulse being divided into several triggers. After this 50-150 ms window has passed, the amplitude, pulse width and time of arrival of the pulse may be computed. These much smaller records, rather than the raw recorded data, may be transmitted back to the main processor for further evaluation. The algorithm may use all three accelerometer axes, two, or only one. This choice may be dynamic, depending on the relative activity in each axis. According to certain embodiments only high value signals are transmitted back to the server, whereas low value signals are not.

During a window of (say) several minutes, the stream may be expected to pass the threshold a certain number of times, N; e.g. following a Poisson distribution (typically N is a low single digit). Typically, an additional threshold is computed for number of events per window that are tolerated or discounted, as opposed to windows exceeding that threshold, which are considered 'high activity' windows. Data regarding these high activity windows e.g. summing the number thereof, may be sent back to the main processor (e.g. central server or cloud). The main processor may evaluate the number of high activity windows and their distribution throughout the following hours to verify that this distribution resembles that which is expected of the vermin, As the vermin is not active continuously, windows of operation may be defined for the sensor and energy usage reduced between windows. The window duration and time between windows may be chosen to assure vermin activity does not go undetected for long, while greatly reducing the proportion of time in which the sensor is continuously monitoring for insect activity.

In the event a tree is suspected of infestation, the main processor may request that the meta-data surrounding the underlying pulses discovered be transmitted and may remove man-made noise sources in using, say, suitable machine learning techniques based on false positives received from other trees in the past, which may continue to refine the algorithm.

Typically, the main processor e.g. that of FIG. 8, continually receives data from a multitude of trees enabling an online learning algorithm that may command trees, in certain areas that have previously been infected, to increase the duty cycle of their sampling windows and even reduce their thresholds and identify vermin at earlier stages. Increasing the duty cycle creates an additional burden on the energy requirements of the sensor, and may be used at discretion, typically in times of higher local alert.

The server application typically includes a big data analytics engine which processes collected data (raw data and meta-data) and generates various views (reports). The collected data may be stored in a database which may be indexed per source (front end), time stamp and/or geographical location. The analytics engine, which may employ conventional big data algorithms for management, storage, SLA and presentation, may handle huge data structures and may generate a specific view that compacts and focuses that data. A standard web services interface may be used to facilitate integration with third party tools for presentation and deep analysis of the data. A suitable web (say) interface allows presentation of pre-configured views (reports), such as, but not limited to, historical and current tree/plan and/or sensor behavior, geographical distribution of events and phenomena, environmental and/or contamination conditions.

When detecting the presence of vermin in certain areas, the big data analytics may immediately and automatically change the detection thresholds and sensitivity of front end devices in the area that is more likely to experience the problem. For example, areas which witness more presence of parasites may be commanded to use a smaller time window and smaller number of detection event candidates before issuing an alert, while trees in areas in which parasites have not been detected lately or ever, may be commanded to accumulate more time and/or more events before issuing an infestation alert.

Detection of verified events in a certain tree or plant may be correlated with the information samples from other trees and plants in the same area and may allow the algorithm to learn about new and less known behavior of the vermin (adaptive fingerprinting). If positive detection of parasites occurred in the field without the system shown and described herein detecting and alerting. (false negative) the raw samples may be re-analyzed and the detection algorithm modified accordingly to increase sensitivity. Then, the modified detection algorithm may be run again on existing raw sample data records to verify which trees are indeed clean, rather than having been missed as a result of the previous impaired ability to detect tree infestation.

Users may elect to receive additional recommendations regarding watering, fertilizing and other best practices at an aggregated level (e.g., a recommendation that an entire field requires more water), or at a specific tree level. By supplying basic information (type of tree, age and other attributes) at the time of sensor installation and supplying periodic information regarding the trees crops after harvest, this data is analyzed by advanced machine learning techniques to spot optimal patterns and sensitivities for trees of similar species and age. In this fashion, the user may get tree-specific recommendation for watering, fertilizing, etc. to optimize seasonal crop growth.

Typically, the sensor analyzes the information and generates a putative tree-level binary final result indicating whether the tree is infected or not, whereas the cloud analyzes the environment information to filter the environmental noises like rain, strong winds, heavy machines working near the trees and other noises that may cause false alarms and may discount certain tree-level results which arrive at the cloud or other central server but are found to be affected by environmental (regional or plantation-level) noises. Typically, tree population based decision making occurs centrally, using data transmitted from individual trees via, typically, long range wireless communication. For example, this central decision making may include deducing regional e.g. plantation level events such as presence of a roar generated by a low-flying plane or heavy machinery operated nearby, or weather effects (whose effect is then discounted from accelerometer readings in relevant trees). This reduces "false positives" plaguing the local detection capabilities of individual trees. According to certain embodiments, additional sensors augment the accelerometer e.g. so as to sense tree impedance which may be relevant to the tree's irrigation status and may be used to trigger suitable proactive irrigation measures e.g. if some areas of the plantation are found to have received less water than others.

Daily or other periodic or on-occasion alerts from tree to central server may include alerts of infected trees e.g. tree ID, time of event, tree status (infected vs. not infected (or, only infected trees transmit an alert), infection level and/or noise level). Typically, only this information is transmitted to keep the transmission short, thereby conserving power. Alternatively, raw data may be transmitted online and analyzed on the cloud which requires more energy since transmissions are longer.

A plantation-level computational method for identifying infected trees, which may be performed centrally e.g. in the cloud, may, for example, comprise some or all of the following: first, thresholds and confidence scores suitable for the operations described below, are determined off-line using a labeled training database. Next, sensor data from each tree in the plantation is transmitted to a central server e.g. cloud for post-processing. Generally, tree status (e.g. infected with insects/larvae) or clean) is determined according to accumulated data from the tree in a particular time window which is compared to a predetermined threshold to determine if the tree is infected or clean at a required level of confidence e.g. confidence score.

Data generated may include all or any subset of the following:

a. Reports on infection probability in each of plural sensing time periods, based on confidence of larvae signal characteristic detected in analyzed signal b. Reports on level of noise of collected data in each sensing time period, based on noise signal characteristic detected in analyzed signal. It is appreciated that plantation-level or regional-level noise signal characteristics (e.g. from an airplane or machinery or wind) typically differ from larvae signal characteristics in duration and/or in strength hence may be learned e.g. machine-learned. Typically, tree collected data is synchronized between trees such that data collected by an individual tree in a particular time window can be compared to data from trees which are adjacent to that individual tree, in the plantation. If more than a defined number of trees around the tree are found to be noisy (e.g. plantation-level or regional-level noise signal characteristics are detected), the individual tree is determined to be affected by environmental noise and its tree data is omitted until the environmental noise has receded. All non-omitted tree data may then be considered as valid for tree status decision.

The sensor on the pin may optionally receive occasional or periodic data/software upgrades and other updates arid parameters (e.g. activity schedule, detection thresholds), from a central server e.g. cloud.

According to certain embodiments, the tree-deployed subsystem described herein, aka front-end unit e.g. as shown in FIGS. 1, 2a-2c, is employed for other purposes since its exact location and unique ID may be known centrally, via communication with a central server e.g. cloud which may have computational functionality.

For example, productivity metering may be provided e.g. recording each task performed in the plant e.g. tree, by each individual worker. Typically, when a worker or group of workers approaches a tree for a specific task, s/he places her or his reader device next to the front-end unit. The front-end unit may record the starting time and/or unique id of the worker(s). Upon task completion, the workers may place their device next to the front end once more, for task completion time-stamping, to facilitate central (say) computation of task duration and generating comparative worker productivity statistics accordingly. If a worker forgets to mark the stop-time aka completion time, the system may take the next starting time of the same worker's next tree, tree n+1, as the stop-time of the task performed by the same worker on tree n.

The worker's reader device may be wearable e.g. housed in a hand-watch like substrate or embedded in a working vest.

Alternatively or in addition, the vibration detection algorithm of the front end may be used to automatically detect when the tree is being treated.

According to one embodiment, an RFID reader is embedded in the front-end unit e.g. As shown in FIGS. 2b, 2c. Logged task data associated with the unique ID of the worker who performed the task, may then be transferred to the central server e.g. cloud's central application server which stores and analyzes all the data. Data transfer may simply occur via messages running between the front end and communication agent e.g. the communication agent of FIGS. 1, 7, then forward to the central application server.

Alternatively or in addition, the front end may be equipped with a passive/active RFID tag read by an external RFID reader which runs a specific logging application. The RFID reader may then comprise a suitable smart phone with RFID reading capabilities, e.g. as in iPhone and Android devices. Data from the smartphone is then transmitted directly to the application server using any suitable data communication network e.g. Internet over cellular or WIFI.

The application server may use the data thus collected to compute any desired statistical properties and views thereof e.g. on a time, location, worker-specific basis. Collated data and statistics may be presented to a plantation manager via a web or mobile application. The application typically provides decision supporting tools, which advise the plantation manager which workers are characterized by high productivity, which are best suited for a specific task, how tasks may be carried out cost effectively, expected deadlines for task completion etc.

For example, data regarding any or all of the following may be provided: workers' productivity, task's duration statistics over a specific parameter such as but not limited to area, tree type, worker; overall cost related to the operation of the plant, and working routes optimization with regard to distance and duration geometry.

It is appreciated that vibrations propagating in air are longitudinal, whereas in the solid tree interior, vibrations include both longitudinal or transverse waves. Microphones placed outside the tree's bark may pick up part of the longitudinal waves created by vibrations generated by insects within the tree that have reached the tree's surface e.g. those waves that have reached the tree bark, vibrated the air and then vibrated the microphone, limiting measurement to longitudinal waves. Contact microphones placed directly on the tree's surface may, based on piezoelectric effects (material contraction responsive to an impacting wave, thereby to generate an electric charge to be measured), may pick up waves perpendicular to the tree surface, i.e. longitudinal, without requiring the wave to first vibrate air between the object measured and the microphone, hence with greater sensitivity to vibrations, but still without measuring movement along the axis perpendicular to the tree surface e.g. without effectively measuring transverse waves. In contrast, inserting an instrument into the tree's interior is advantageous inter alia to conduct both longitudinal and transverse waves using a structural element selected to be long enough (e.g., for palm trees whose diameter is 20-100 cm, 60-200 mm length, 3-12 mm diameter) and of a rigidity which enables the pin to effectively conduct waves directly to an accelerometer operative to pick up vibrations of all dimensions including transverse waves that would have been lost to an acoustic sensor, thereby to generate an identification of the tree's state which is both more accurate and more sensitive. A pin inserted within the tree can pick up transverse and longitudinal waves while they are stronger and conduct them with much less absorption, if the pin is rigid and formed of a material with lower absorption than the tree. In contrast, accelerometers outside the tree would have difficulty in picking up transverse waves since signal strength decreases quickly as a function of distance from the insect located inside the tree, due to the high absorption properties of tree material.

It is appreciated that many variations are possible. For example, only some of the features or operations described herein in combination may be provided, rather than all. Also, according to some embodiments, the sensor is connected to or mounted on the pin and when the pin has been threaded or forced or otherwise inserted into the tree trunk the sensor is 1-3 cm from the tree trunk. Alternatively, the sensor/accelerometer may be an integral part of the pin and may be located inside the tree trunk when the pin is threaded or forced or otherwise inserted into the tree. More generally, the vibration sensor is typically fixed in any suitable manner relative to the rigid structural element (e.g. integrally formed with, attached to, aboard) so as to vibrate together with the rigid structural element.

According to certain embodiments, an accelerometer, typically tri-axial, or other vibration sensor operative to directly sense vibrations of a solid (as opposed to a microphone which senses vibrations of a solid indirectly, since the solid's vibrations result in air vibration sensed by the microphone) is provided. The sensor/accelerometer may for example be incorporated into (a PCB deployed within) a rigid (e.g. formed of carbon street) elongate structural element. The structural element is configured to be driven (e.g. forced or screwed or wedged), front portion first, into the tree's interior thereby to vibrate in association with, hence directly measure, vibration of the tree's interior.

According to some embodiments, the sensor resides in the rear portion e.g. head, typically, of the structural element, which may facilitate communication between an external-to-the-tree e.g. remote/cloud processor to communicate with the sensor. However, according to other embodiments, the accelerometer is internal to the tree and is not necessarily positioned adjacent the rear end of the structural element, to enhance signal strength and limit noise emanating from sources external to the tree.

It is appreciated that any other suitable accelerometer and structural element with different dimensions, material or configuration, which upon pretesting is capable of sensing the insect activity, may be employed. Capability of sensing known insect activity may be directly verified, or sensing capability may be compared to the sensing capability of a structural element, with vibration sensor aboard, known to perform successfully, e.g. any method shown or described specifically herein by way of example.

The systems and methods herein are for the most part described with reference to detection of red palm weevil (rpw) larvae in palm trees, however, this is of course not intended to be limiting. For example, the systems and methods herein, mutatis mutandis, may be implemented for discovering other insects including larvae in other trees.

It is appreciated that terminology such as "mandatory", "required", "need" and "must" refer to implementation choices made within the context of a particular implementation or application described herewithin for clarity and are not intended to be limiting since in an alternative implantation, the same elements might be defined as not mandatory and not required or might even be eliminated altogether.

Components described herein as software may, alternatively, be implemented wholly or partly in hardware and/or firmware, if desired, using conventional techniques, and vice-versa. Each module or component or processor may be centralized in a single physical location or physical device or distributed over several physical locations or physical devices.

Included in the scope of the present disclosure, inter alia, are electromagnetic signals in accordance with the description herein. These may carry computer-readable instructions for performing any or all of the operations of any of the methods shown and described herein, in any suitable order including simultaneous performance of suitable groups of operations as appropriate; machine-readable instructions for performing any or all of the operations of any of the methods shown and described herein, in any suitable order; program storage devices readable by machine, tangibly embodying a program of instructions executable by the machine to perform any or all of the operations of any of the methods shown and described herein, in any suitable order i.e. not necessarily as shown, including performing various operations in parallel or concurrently rather than sequentially as shown; a computer program product comprising a computer useable medium having computer readable program code, such as executable code, having embodied therein, and/or including computer readable program code for performing, any or all of the operations of any of the methods shown and described herein, in any suitable order; any technical effects brought about by any or all of the operations of any of the methods shown and described herein, when performed in any suitable order; any suitable apparatus or device or combination of such, programmed to perform, alone or in combination, any or all of the operations of any of the methods shown and described herein, in any suitable order; electronic devices each including at least one processor and/or cooperating input device and/or output device and operative to perform e.g. in software any operations shown and described herein; information storage devices or physical records, such as disks or hard drives, causing at least one computer or other device to be configured so as to carry out any or all of the operations of any of the methods shown and described herein, in any suitable order; at least one program pre-stored e.g. in memory or on an information network such as the Internet, before or after being downloaded, which embodies any or all of the operations of any of the methods shown and described herein, in any suitable order, and the method of uploading or downloading such, and a system including server/s and/or client/s for using such; at least one processor configured to perform any combination of the described operations or to execute any combination of the described modules; and hardware which performs any or all of the operations of any of the methods shown and described herein, in any suitable order, either alone or in conjunction with software. Any computer-readable or machine-readable media described herein is intended to include non-transitory computer- or machine-readable media.

Any computations or other forms of analysis described herein may be performed by a suitable computerized method. Any operation or functionality described herein may be wholly or partially computer-implemented e.g. by one or more processors. The invention shown and described herein may include (a) using a computerized method to identify a solution to any of the problems or for any of the objectives described herein, the solution optionally including at least one of a decision, an action, a product, a service or any other information described herein that impacts, in a positive manner, a problem or objectives described herein; and (b) outputting; the solution.

The system may, if desired, be implemented as a web-based system employing software, computers, routers and telecommunications equipment as appropriate.

Any suitable deployment may be employed to provide functionalities e.g. software functionalities shown and described herein. For example, a server may store certain applications, for download to clients, which are executed at the client side, the server side serving only as a storehouse. Some or all functionalities e.g. software functionalities shown and described herein may be deployed in a cloud environment. Clients e.g. mobile communication devices such as smartphones may be operatively associated with but external to the cloud.

The scope of the present invention is not limited to structures and functions specifically described herein and is also intended to include devices which have the capacity to yield a structure, or perform a function, described herein, such that even though users of the device may not use the capacity, they are if they so desire able to modify the device to obtain the structure or function.

Features of the present invention, including operations, which are described in the context of separate embodiments may also be provided in combination in a single embodiment. For example, a system embodiment is intended to include a corresponding process embodiment and vice versa. Also, each system embodiment is intended to include a server-centered "view" or client centered "view", or "view" from any other node of the system, of the entire functionality of the system, computer-readable medium, apparatus, including only those functionalities performed at that server or client or node. Features may also be combined with features known in the art and particularly although not limited to those described in the Background section or in publications mentioned therein.

Conversely, features of the invention, including operations, which are described for brevity in the context of a single embodiment or in a certain order may be provided separately or in any suitable subcombination, including with features known in the art (particularly although not limited to those described in the Background section or in publications mentioned therein) or in a different order. "e.g." is used herein in the sense of a specific example which is not intended to be limiting. Each method may comprise some or all of the operations illustrated or described, suitably ordered e.g. as illustrated or described herein.

Devices, apparatus or systems shown coupled in any of the drawings may in fact be integrated into a single platform in certain embodiments or may be coupled via any appropriate wired or wireless coupling such as but not limited to optical fiber, Ethernet, Wireless LAN, HomePNA, power line communication, cell phone, Smart Phone (e.g. iPhone), Tablet, Laptop, PDA, Blackberry CPRS, Satellite including GPS, or other mobile delivery. It is appreciated that in the description and drawings shown and described herein, functionalities described or illustrated as systems and sub-units thereof can also be provided as methods and operations therewithin, and functionalities described or illustrated as methods and operations therewithin can also be provided as systems and sub-units thereof. The scale used to illustrate various elements in the drawings is merely exemplary and/or appropriate for clarity of presentation and is not intended to be limiting.

The invention claimed is:

1. A system for monitoring for presence of insects in non-hollow trees, the system including:
 a structural element configured to be driven into an interior of the tree and bearing a vibration sensor; and
 a processor configured to receive data recorded by the sensor, to detect presence movement of insects in the interior of the tree by analyzing the data, and to generate alerts accordingly,
 wherein the structural element, when installed, passes all the way through a peripheral portion of a trunk of the tree to a central portion of the trunk of the tree.

2. A method for monitoring for presence of insects in non-hollow trees, the method including:
 Providing a structural element configured to be driven into an interior of the tree and bearing a vibration sensor; and
 Providing a processor configured to receive data recorded by the sensor, to detect presence movement of insects in the interior of the tree by analyzing the data, and to generate alerts accordingly,
 wherein the vibration sensor comprises an accelerometer, and wherein the structural element driven into the interior of the tree conducts waves directly to the accelerometer.

3. A system according to claim 1 wherein the processor is remote from the tree and obtains said data via a wireless data connection with the sensor.

4. A method according to claim 2 wherein the data received by the processor comprises acceleration values along three axes.

5. A method according to claim 2 wherein the sensor is mounted on a pin configured to be driven into the tree, thereby to enhance signal transmission from tree interior to sensor.

6. A system according to claim 1 wherein the insect comprises a larva.

7. A method according to claim 2 and also comprising applying (e.g. spraying or injecting) pesticides to trees according to said alerts.

8. A method according to claim 2 wherein the sensor is embedded in the tree's trunk.

9. A system according to claim 1 and also comprising an Internet of Things subsystem operative to collect said alerts.

10. A system according to claim 1 wherein the trees comprise palm trees and the insects comprise red palm weevils.

11. A system according to claim 9 and wherein a wireless network protocol configured to send packets of data at regular intervals over a wireless network, is employed by said subsystem to collect said alerts.

12. A system according to claim 9 wherein the vibration sensor is also configured to detect that the tree is being treated by a worker and wherein the Internet of Things subsystem is used to collect time-stamped outputs identifying durations of time in which a worker treated each tree.

13. A method according to claim 5 and wherein an RFID reader is mounted on the pin and is operative to generate time-stamped indications of workers with wearable RFID tags who are tending each individual tree.

14. A method according to claim 5 and wherein an RFID tag is mounted on the pin and facilitates generation of time-stamped indications of tag-reader proximity, by RFID readers borne by workers who are tending each individual tree.

15. A system according to claim 11 wherein said protocol comprises a LoRa protocol.

16. A system according to claim 1 wherein said vibration sensor comprises an accelerometer.

17. A system according to claim 1 wherein said vibration sensor comprises a Piezoelectric accelerometer.

18. A system according to claim 1 and wherein the processor is configured for machine learning, including learning, based on a training set including:
 samples of acceleration values along at least one axis from trees in which insects are present and samples of acceleration values along at least one axis from trees in which insects are absent, to differentiate acceleration values along at least one axis indicative of insect-generated body waves from acceleration values along at least one axis indicative of other noise.

19. A system according to claim 16 wherein said accelerometer is tri-axial.

20. A system according to claim 1 wherein the processor is configured to receive data representing transverse body waves recorded by the sensor, and wherein machine learning including using a training set including samples from trees in which insects are present and samples from trees in which insects are absent, is used to learn to differentiate sensor outputs indicative of insect-generated body waves from sensor outputs indicative of other noise.

21. A computer program product, comprising a non-transitory tangible computer readable medium having computer readable program code embodied therein, said computer readable program code adapted to be executed to implement a method for monitoring for presence of insects in non-hollow trees wherein a structural element bearing a vibration sensor has been driven into an interior of the tree, the method including:

providing a processor configured to receive data recorded by the sensor, to detect presence movement of insects in the interior of the tree by analyzing said data, and to generate alerts accordingly, wherein the vibration sensor comprises an accelerometer, and wherein the structural element driven into the interior of the tree conducts waves directly to the accelerometer.

22. A system according to claim 1 wherein the vibration sensor comprises an accelerometer, and wherein the structural element driven into the interior of the tree conducts waves directly to the accelerometer.

* * * * *